US011640708B1

(12) United States Patent
Blechschmidt et al.

(10) Patent No.: US 11,640,708 B1
(45) Date of Patent: May 2, 2023

(54) SCENE GRAPH-BASED SCENE RE-IDENTIFICATION

(71) Applicant: Apple Inc., Cupertino, CA (US)

(72) Inventors: Angela Blechschmidt, San Jose, CA (US); Alexander S. Polichroniadis, Sunnyvale, CA (US); Daniel Ulbricht, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 96 days.

(21) Appl. No.: 17/227,724

(22) Filed: Apr. 12, 2021

Related U.S. Application Data

(60) Provisional application No. 63/010,725, filed on Apr. 16, 2020.

(51) Int. Cl.
*G06V 20/10* (2022.01)
*G06K 9/62* (2022.01)
*G06V 20/40* (2022.01)

(52) U.S. Cl.
CPC ............ *G06V 20/10* (2022.01); *G06K 9/6215* (2013.01); *G06K 9/6296* (2013.01); *G06V 20/46* (2022.01)

(58) Field of Classification Search
CPC ...... G06V 20/10; G06V 20/46; G06K 9/6215; G06K 9/6296
See application file for complete search history.

(56) References Cited

U.S. PATENT DOCUMENTS

| 6,919,891 | B2 | 7/2005 | Schneider et al. |
| 9,219,922 | B2 | 12/2015 | Brockmann et al. |
| 9,773,177 | B2 | 9/2017 | Takemura et al. |
| 2018/0184178 | A1* | 6/2018 | Hoeben ................ G06F 16/986 |

FOREIGN PATENT DOCUMENTS

CN 102930246 2/2013

* cited by examiner

*Primary Examiner* — Sam Bhattacharya
(74) *Attorney, Agent, or Firm* — Thompson Hine LLP (57) ABSTRACT

Implementations disclosed herein provide systems and methods that match a current scene graph associated with a user's current environment to a prior scene graph for a prior environment to determine that the user is in the same environment. The current scene graph is compared with the prior scene graph based on matching the objects within the current scene graph with objects within the prior scene graph.

20 Claims, 8 Drawing Sheets

SCENE GRAPH-BASED SCENE RE-IDENTIFICATION

CROSS-REFERENCE TO RELATED APPLICATIONS

This Application claims the benefit of U.S. Provisional Application Ser. No. 63/010,725 filed Apr. 16, 2020, which is incorporated herein in its entirety.

TECHNICAL FIELD

The present disclosure generally relates to identifying scenes including physical objects and, in particular, to systems, methods, and devices that estimate relationships and classify objects in physical environments in order to re-identify a previously captured scene.

BACKGROUND

Various computer vision techniques are used to identify physical objects in physical environments, e.g., a "scene." For example, images captured by a camera may be automatically evaluated to determine that a physical environment includes a table, a chair, and a vase. Attempts to identify such a physical environment at a later time based on detecting those same objects, however, have generally been ineffective and inefficient, especially in circumstances in which one or more of the objects have changed position or orientation in the physical environment.

SUMMARY

Implementations disclosed herein provide systems and methods that match a current scene graph associated with a user's current environment to a prior scene graph for a prior environment to determine that the user is in the same environment. A scene graph for an environment may represent objects within the environment and relationships between the objects within the environment. Prior techniques attempted to match keyframes or features and often failed to identify that the user is in a prior user environment because environmental changes (e.g., movement of a chair, lighting, etc.) caused the keyframe or feature matching to fail. The use of a scene graph-based comparison may enable a more robust comparison based on the organization of object-specific information and object relationships. For example, a scene graph comparison may match a chair in two scene graphs even if the chair has been moved within the environment.

In some implementations, a scene graph is generated for a current environment based on one or more images of the current environment. For example, a scene graph may include a room node and the room node may identify metadata (e.g., its object type/semantic label of "living room"). Moreover, the room node may be linked to four wall objects, a table object, and six chair objects. As a further example, one or more chair objects may identify metadata (e.g., identifying object type/semantic label of "chair," a 3D mesh with specific node locations, a color of brown, particular keyframes or keyframe portions, etc.). In some implementations, the relationships represented by the scene graph are positional, e.g., within, adjacent to, facing, etc.

In some implementations, the scene graph for the current environment is compared with a scene graph for a prior environment based on matching the objects within the scene graph for the current environment with objects within the scene graph for the prior environment. For example, the comparison may attempt to match object metadata, object types or semantic labels, object-specific 3D meshes, object-specific keyframes, or location information. Moreover, the comparison may exclude certain types of objects, e.g., object types that are transient, such as food containers. In some implementations, the comparison may produce a score or may be multi-step and may refine a score in steps. For example, the comparison may first compare the room objects and obtain a score and proceed to compare objects within the room only if the score is high enough, and then refine the score based on the additional matching of those objects.

In some implementations, a hierarchical matching approach is utilized. For example, this may involve matching the room type, the objects and what relations the objects have, then matching meta information, e.g., color, material, etc., and then matching features. Such a hierarchical matching approach may be relatively more robust with respect to changes in the scene and may facilitate quicker scene reidentification, for example, because a comparison with a given candidate scene can be discontinued if the initial steps are negative, e.g., if the room type does not match. As another example, if the current room has more than a threshold number or percentage of different objects, the process can determine that the room is not a match and discontinue further comparison, e.g., without attempting to match meta information or features.

In some implementations, it is determined that the current environment matches the prior environment based on the matching, e.g., the output may be a yes/no match determination or a matching score or probability of a match. For example, it may be determined that the user is in the same room or that the user is in a current room that is very similar to another room, e.g., a room with the same floor plan and furniture objects.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While figures may depict exemplary implementations involving a handheld electronic device, other implementations do not necessarily involve a handheld device and may involve other types of devices including, but not limited to, televisions, set-top devices, laptops, desktops, gaming devices, home automation devices, watches, head-mounted devices (HMDs), and other wearable electronic devices, and other devices that process or display content.

Figure 1:
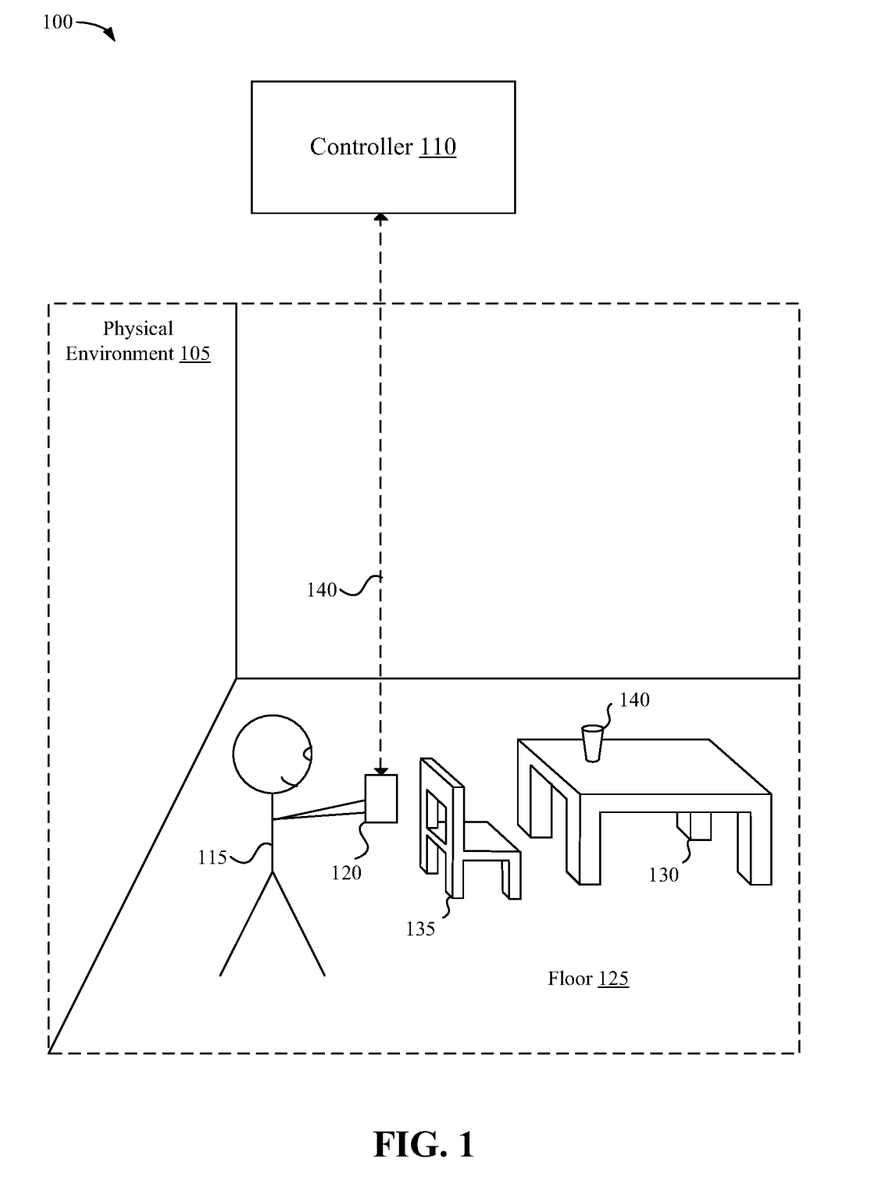
FIG. 1 is a block diagram of an example operating environment in accordance with some implementations.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110, a user 115, and an electronic device 120, one or both of which may be in a physical environment 105. As a non-limiting example, the physical environment includes physical objects, such as floor 125, table 130, chair 135, and cup 140.

The electronic device 120 is configured to process or display content. In some implementations, the electronic device 120 includes a suitable combination of software, firmware, or hardware. The content may be provided for display on the electronic device 120 from a recorded source or a live source. For example, content may be stored in a memory on the electronic device 120, the controller 110, or elsewhere. In another example, content may be a stream of frames captured or processed in real time by a camera on the electronic device 120, the controller 110, or elsewhere. The electronic device 120 is described in greater detail below with respect to FIG. 5. In some implementations, the functionalities of the controller 110 are provided by or combined with the electronic device 120, for example, in the case of an electronic device that functions as a stand-alone unit.

In some implementations, the controller 110 is a computing device that is local or remote relative to the physical environment 105. In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 140 (e.g., BLUETOOTH, IEEE 802.11x, IEEE 802.16x, IEEE 802.3x, etc.).

In some implementations, the device 15 is configured to manage, coordinate, and, present an extended reality (XR) environment to the user 10. In some implementations, the device 15 includes a suitable combination of software, firmware, or hardware. The device 15 is described in greater detail below with respect to FIG. 5. In some implementations, a controller of the device 15 is a computing device that is local or remote relative to the physical environment 5. In some implementations, the functionalities of the controller of the device 15 are provided by or combined with the device 15, for example, in the case of a head-mounted device (HMD) that functions as a stand-alone unit.

In one example, a controller of the device 15 is a local server located within the physical environment 5. In another example, the controller of the device 15 is a remote server located outside of the physical environment 5 (e.g., a cloud server, central server, etc.). In some implementations, the controller of the device 15 is communicatively coupled with the device 15 via one or more wired or wireless communication channels (e.g., BLUETOOTH, IEEE 802.11x, IEEE 802.16x, IEEE 802.3x, etc.).

According to some implementations, the device 120 presents, manages, or coordinates an extended reality (XR) environment while the user 115 is present within the physical environment 105. Moreover, techniques disclosed herein may be used to facilitate the provision of a XR environment. An extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect rotational head movement and, in response, adjust graphical content and an acoustic field presented to the person in a manner similar to how such views and sounds would change in a physical environment. As another example, the XR system may detect rotational or translational movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), adjustments to characteristic(s) of graphical content in an XR environment may be made in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
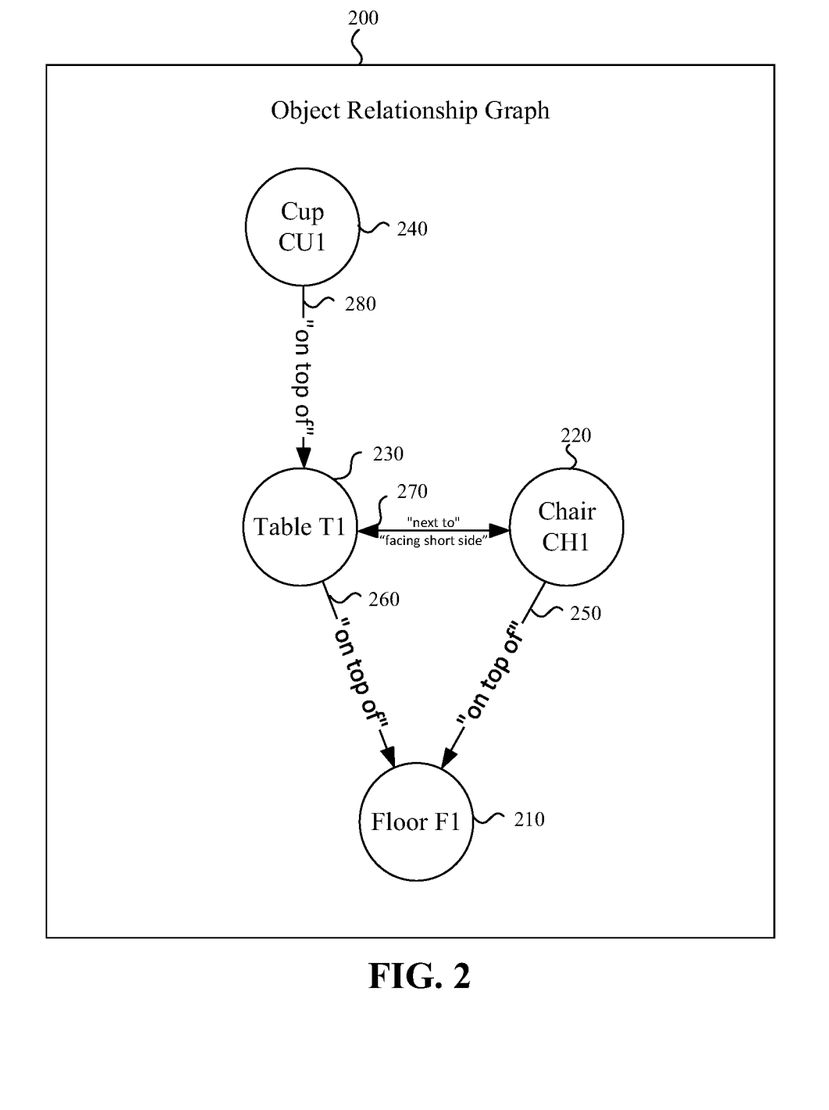
FIG. 2 is an object relationship graph representing relationships between objects in the operating environment according to some implementations.

FIG. 2 is an object relationship graph representing relationships between objects (e.g., floor 125, table 130, chair 135, and cup 140) in physical environment 105. In this example, the object relationship graph 200 includes a first object 210, a second object 220, a third object 230, and a fourth object 240. The first object 210 has type label "floor" and instance label "F1." The second object 220 has type label "table" and instance label "T1." The third object 230 has type label "chair" and instance label "CH1." The fourth object 240 has type label "cup" and instance label "CU1." In addition, the object relationship graph 200 identifies relationships 250, 260, 270, and 280 between objects 210, 220, 230, and 240. The first relationship 250 identifies that the second object 220 is "on top of" the first object 210. The second relationship 260 identifies that the third object 230 is "on top of" the first object 210. The third relationship 270 identifies that the second object 220 is "next to" and "facing the short side" of the third object 230. The fourth relationship 280 identifies that the fourth object 240 is "on top of" the third object 230. It should be noted that the relationships illustrated in the object relationship graph 200 need not be limited to holding only one label—two, three, or more labels per relationship may be desirable.

In some implementations, the object relationship graph is generating by transforming a semantic mesh into a graph. In some implementations the object relationship graph is generated by transforming a point cloud into a graph. In some implementations, a physical environment is represented by object information that identifies objects and their 2D or 3D positions, e.g., using 2D or 3D bounding boxes, and the representation of the physical environment is transformed into a graph. In some implementations, the objects and relative 2D or 3D locations of the objects (e.g., or their respective bounding boxes) in 2D or 3D coordinates are used to determine room type, objects, object-to-object relationships, meta information (e.g., color, material, etc.), and features that are represented in a graph.

In some implementations, the 3D shape of a semantic mesh may represent surfaces of objects of a physical environment and at least some of the vertices of the semantic mesh have semantic labels identifying object type (e.g., table, chair, vase, etc.). In such a mesh, for example, vertices on the floor surface may be labelled "floor", vertices on a chair's surfaces may be labelled "chair."

In some implementations, generating a semantic mesh involves estimating depths of different portions (e.g., pixels) of multiple images of a physical environment, correlating relationships (e.g., transforms) between poses of a camera used to capture the images, and generating a 3D mapping or other reconstruction of surfaces in the physical environment. Such a mapping/reconstruction may include locations in a 3D coordinate system for different surface points. In some implementations, a 3D triangle-based mesh is generated and each vertex of the mesh stores or otherwise is associated with a location, e.g., x,y,z positional information. One or more machine learning algorithms may be used to generate a 3D reconstruction.

In some implementations, generating a semantic mesh involves techniques that do not utilize a machine learning model. For example, one exemplary method uses an algorithm to project vertices of a 3D reconstruction mesh onto semantic segmentation images from different viewpoints and then uses a majority voting technique to determine final vertices labels.

In some implementations, semantic information is included in or added to a 3D reconstruction of a physical environment. One or more machine learning models may be used to classify objects, include, or add semantic information to a 3D reconstruction. In some implementations, a machine learning model is used to generate semantic labels for pixels of one or more images of the physical environment. Such semantic labels may be associated with corresponding portions of a 3D reconstructions based on determining associations between images and the 3D reconstruction. In some implementations, a machine learning model uses a 3D reconstruction and semantically labelled images (e.g., automatically labelled images) as input to produce a semantically-labeled mesh, e.g., a semantic mesh having at least some vertices that are associated with semantic labels.

In some implementations, transforming the semantic mesh into a graph involves converting the vertices of the semantic mesh to nodes and determining edges connecting nearby nodes to one another. The edges of the graph may represent the sides of the faces of the semantic mesh. The nodes may store information about the coordinates (e.g., x, y, z coordinates), semantic labels, and other information extracted from the semantic mesh.

In some implementations, graph reduction reduces the complexity of the original semantic mesh or the graph representing the original semantic mesh, for example, reducing the number of nodes in such a graph. In some implementations, instance detection involves identifying or estimating separate instances of objects in the semantic mesh or graph representing the semantic mesh. In some implementations, instance detection is performed using a machine learning model that utilizes semantic locations and 3D locations of nodes of the graph to identify instances.

In some implementations, a machine learning model is used to estimate relationships between objects of the semantic mesh or graph representing the semantic mesh. Examples of relationships include, but are not limited to, estimations that a first object is on top of a second object, a first object is under a second object, a first object is next to a second object, a first object is in contact with a second object, a first object is attached to a second object, a first object is leaning on a second object, a first object (e.g., a person) is holding a second object, a first object is within a second object, a first object is hanging from a second object, a first object is close to a second object, a first object is facing towards a second object, a first object is facing away from a second object, a first object is in front of a second object, a first object is behind a second object, and a first object and a second object are aligned with one another.

In some implementations, the relationships between objects that are produced by the machine learning model are estimated as probabilities, e.g., providing a 99% chance that table T1 is on top of floor F1, a 90% chance that container CU1 on top of table T1, a 75% chance that chair CH1 is next to table T1, a 75% chance that chair C2 is facing television TV1, a 75% chance that handle H1 is attached to door D1, etc.

An image of the physical environment and/or pose information about the position and orientation of a camera capturing the image may additionally be input to the machine learning model to further improve its accuracy or efficiency. Camera pose information may be used to produce viewpoint specific relationships. For example, if a XR environment is being produced using live images, the pose (e.g., location and orientation) of the user's current device may be used to facilitate a viewpoint specific relationship determination, e.g., identifying that, from the user's current viewpoint, the chair is in front of the table.

In some implementations, the machine learning model outputs a graph representing the objects and their relationships, e.g., object relationship graph 200. In some implementations, the machine learning model outputs pairwise relationships between objects. A relationship between two or more objects may be represented in any suitable format for output and use.

Figure 3:
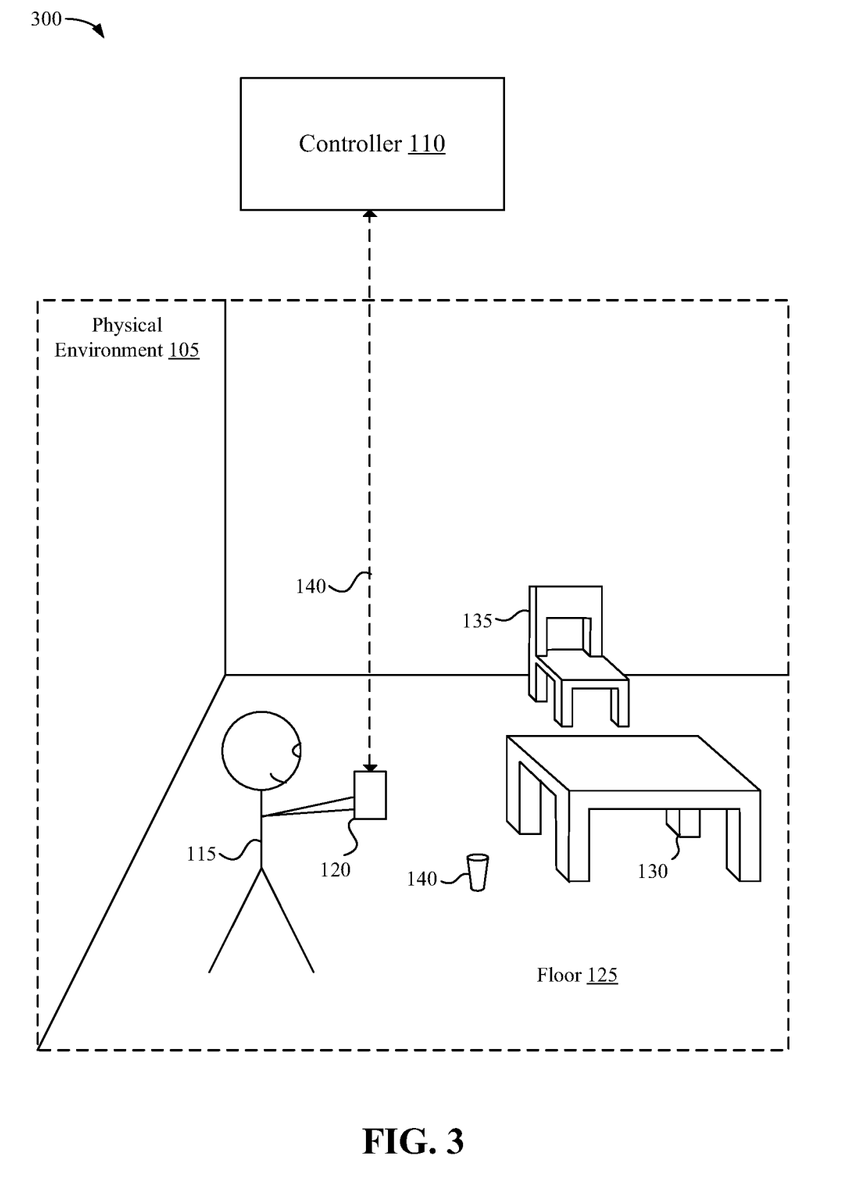
FIG. 3 is a block diagram representing changes in object position of the operating environment in accordance with some implementations.

FIG. 3 is a is a block diagram of operating environment 300 in accordance with some implementations, including illustrative changes in object position of the operating environment 100. For example, in operating environment 300 the cup 140 is resting on the floor 125, whereas in operating environment 100 the cup 140 is resting on the table 130. Moreover, in operating environment 300, the chair 135 is facing a long side of the table 130, whereas in operating environment 100, the chair is facing a short side of the table 130. Also, the position of the table 130 is unchanged in operating environment 300 as compared to operating environment 100.

Figure 4:
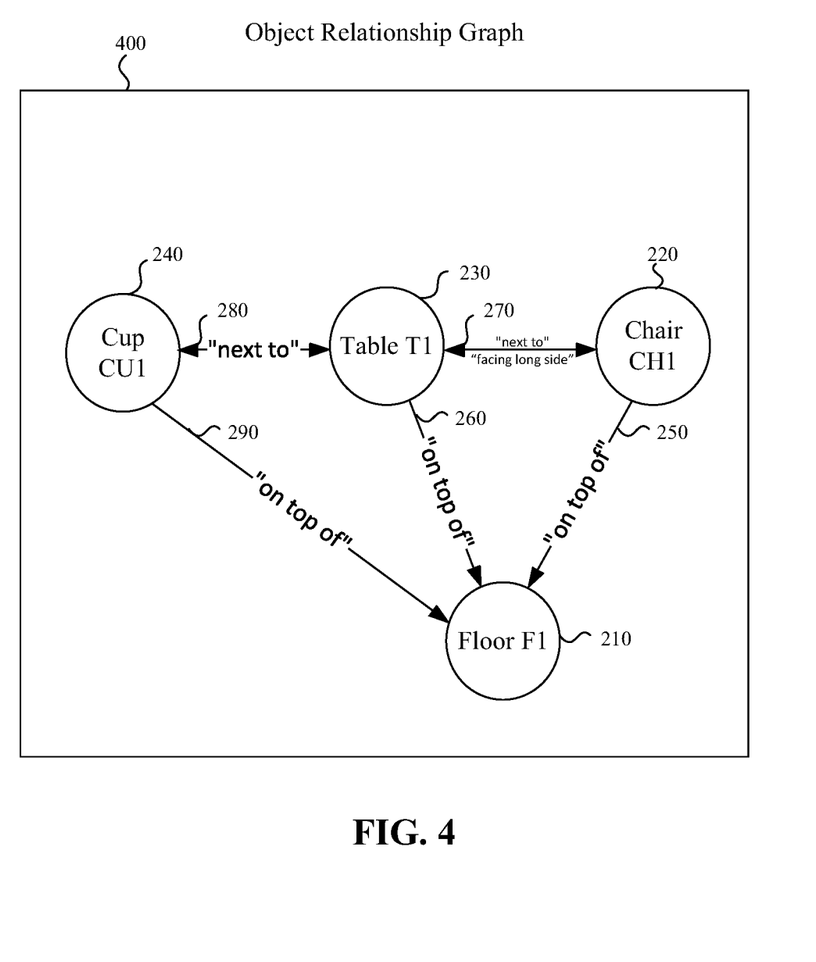
FIG. 4 is an object relationship graph representing the changes in relationships between objects based on the changes in object position according to some implementations.

FIG. 4, according to some implementations, is an object relationship graph 400 representing the relationships between objects 125, 130, 135, and 140 based on the changes to object position illustrated in operating environment 300 of FIG. 4. In this example and relative to object relationship graph 200 of FIG. 2, the relationship 280 of the third object 230 to the fourth object 240 no longer identifies that the fourth object 240 is "on top of" the third object 230, but instead identifies that the fourth object 240 is "next to" the third object. Moreover, a new fifth relationship 290 identifies that the fourth object 240 is "on top of" the first object 210. Also, the relationship 270 of the second object 220 to the third object 230 now identifies that the second object 220 is "next to" and "facing the long side" of the third object 230. It should again be noted that the relationships illustrated in the object relationship graph 400 need not be limited to holding only one label—two, three, or more labels per relationship may be desirable.

In some implementations, the object relationship graph 400 (e.g., a scene graph for the current environment) is compared to the object relationship graph 200 (e.g., a scene graph for a prior environment) based on matching the objects within the scene graph for the current environment with objects within the scene graph for the prior environment. In some implementations, the comparison includes attempting to match object metadata, object types/semantic labels, object-specific 3D meshes, object-specific keyframes, or location information. For example, it may be determined that two nodes from different object relationship graphs have the same semantic label, e.g., that both are labelled "chair," etc.

In some implementations, the object relationship graph 400 (e.g., a scene graph for the current environment) is compared to the object relationship graph 200 (e.g., a scene graph for a prior environment) based on comparing the object relationships within the scene graph for the current environment with object relationships within the scene graph for the prior environment. In some implementations, relationships between separate objects are determined and compared based on whether a first object of the separate objects is in contact with a second object of the separate objects (e.g., determination of whether the objects are touching, contacting, etc.). In some implementations, this involves determining whether a first position of a first object of the separate objects satisfies a distance-based threshold condition with respect to a second position of a second object of the separate objects (e.g., to determine whether the objects are attached, near, next to, etc.). In some implementations, this involves determining whether a first position of a first object of the separate objects satisfies an orientation-based threshold condition with respect to a second position of a second object of the separate objects (e.g., to determine whether the objects are facing, on top of, beneath, etc.).

In some implementations, the relationships are determined or compared by determining a first bounding box associated with a first object of the separate objects, determining a second bounding box associated with a second object of the separate objects, and determining a relationship by comparing the first bounding box and the second bounding box (e.g., to determine whether an object encloses or is within another object, etc.).

In some implementations, determining or comparing the relationships involves generating rays based on a position of a first objects, determining intersections of the rays with a second object of the separate objects, and determining a relationship based on the intersections.

Moreover, the comparison may exclude certain types of objects. For example, object types that are transient (e.g., food containers) may be excluded from the comparison. In some implementations, the comparison may produce a score and, in some implementations; the comparison may be multi-step, hierarchical, and/or may refine a score in steps. For example, the comparison may first compare the room objects and obtain a score and proceed to compare objects within the room only if the score is high enough, and then refine the score based on the additional matching of those objects.

Based on the comparison or matching, it may be determined that the current environment matches the prior environment. For example, an output may be a yes/no match determination or a matching score or probability of a match. As another example, it may be determined based on the matching that the user is the same room. For example, it may be determined that the user is in a current room that is very similar to another room, e.g., a room with the same floor plan and furniture objects.

Figure 5:
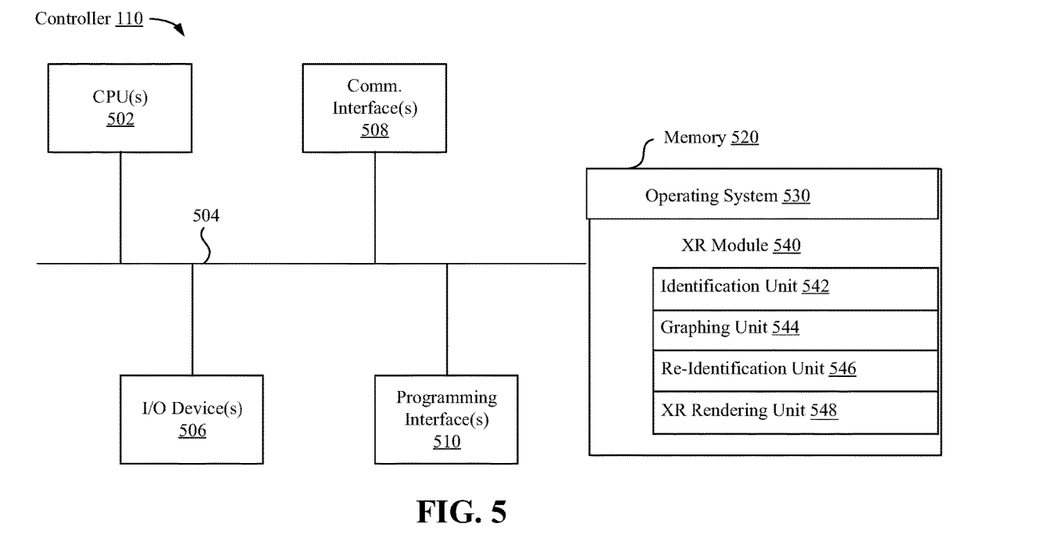
FIG. 5 is a block diagram of an example controller in accordance with some implementations.

FIG. 5 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 502 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 506, one or more communication interfaces 508 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 510, a memory 520, and one or more communication buses 504 for interconnecting these and various other components.

In some implementations, the one or more communication buses 504 include circuitry that interconnects and controls communications between system components. In some implementations, the one or more I/O devices 506 include at least one of a keyboard, a mouse, a touchpad, a joystick, one or more microphones, one or more speakers, one or more image capture devices or other sensors, one or more displays, or the like.

The memory 520 includes high-speed random-access memory, such as dynamic random-access memory (DRAM), static random-access memory (SRAM), double-data-rate random-access memory (DDR RAM), or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530 and a computer vision (CV) and extended reality (XR) module 540.

The operating system 530 includes procedures for handling various basic system services and for performing hardware dependent tasks. In some implementations, the XR module 540 includes an identification unit 542, a graphing unit 544, a re-identification unit 546, and a CRR unit 548.

The identification unit 542 may be configured to identify, annotate, or classify objects of the physical environment. For example, the identification unit 542 may be configured to generate a semantic mesh, for example, using 3D reconstruction techniques (e.g., algorithms or machine learning models) that provide a 3D triangle mesh representing surfaces of a physical environment and/or semantic image segmentation techniques (e.g., algorithms or machine learning models) to annotate or classify objects of the physical environment.

The graphing unit 544 may be configured to generate a scene graph or object relationship graph. In some implementations, the graphing unit 544 is configured to classify objects and estimate relationships between the objects, for example, using a machine learning model (e.g., neural network) that uses a representation of an original semantic mesh provided by the identification unit 542.

The re-identification unit 546 may be configured to re-identify, re-annotate, or re-classify objects of the physical environment. For example, the re-identification unit 546 may be configured to re-generate a semantic mesh, for example, using 3D reconstruction techniques (e.g., algorithms or machine learning models) that provide a 3D triangle mesh representing surfaces of a physical environment and/or semantic image segmentation techniques (e.g., algorithms or machine learning models) to annotate or classify objects of the physical environment.

The XR rendering unit 548 may be configured to render XR environments that include depictions of the physical environment, virtual content, or both. The XR rendering unit 548 may be configured to utilize objects and/or relationships classified or estimated by the graphing unit 544. For example, the XR rendering unit 548 may determine to place a virtual vase on "the table next to the window" based on a determination that the current environment matches a previous environment, e.g., matching the location of the virtual vase in the current environment to that of the previous environment.

Although these modules and units are shown as residing on a single device (e.g., the controller 110), it should be understood that in other implementations, any combination of these modules and units may be located in separate computing devices. Moreover, FIG. 5 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 6:
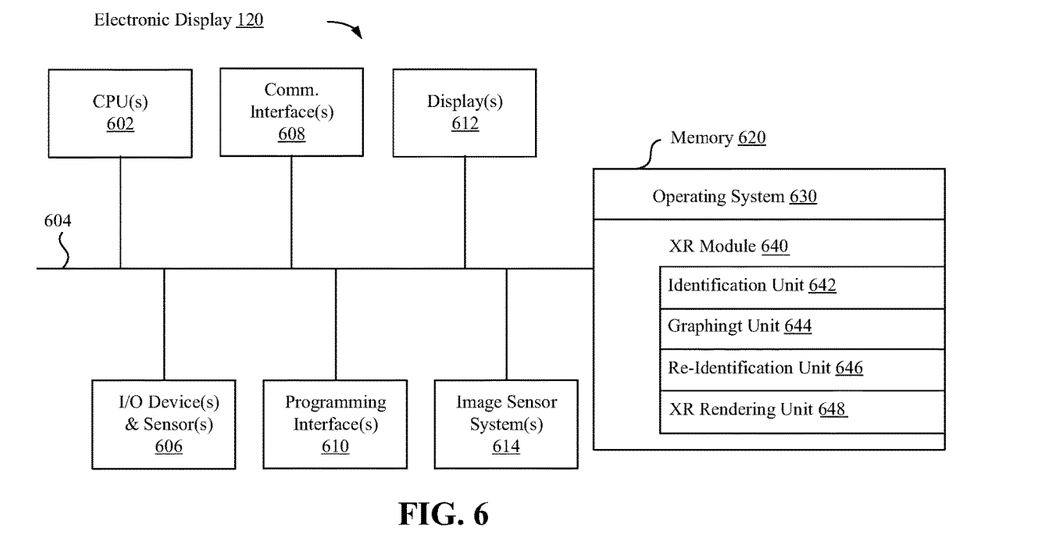
FIG. 6 is a block diagram of an example electronic device in accordance with some implementations.

FIG. 6 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 602 (e.g., microprocessors, ASICs, FPGAs, GPUs, CPUs, processing cores, or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 610, one or more displays 612, one or more interior or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 612 are configured to present an XR experience to the user. In some implementations, the one or more displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 612 correspond to diffractive, reflective, polarized, holographic, etc. waveguide displays. For example, the electronic device 120 includes a single display. In another example, the electronic device 120 includes a display for each eye of the user.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium. In some implementations, the memory 620 or the non-transitory computer readable storage medium of the memory 620 stores the following programs, modules and data structures, or a subset thereof including an optional operating system 630 and a computer vision (CV) and extended reality (XR) module 640.

The operating system 630 includes procedures for handling various basic system services and for performing hardware dependent tasks. In some implementations, the XR module 640 includes an identification unit 642, a graphing unit 644, a re-identification unit 646, and a XR rendering unit 648.

The identification unit 642 may be configured to identify, annotate, or classify objects of the physical environment. For example, the identification unit 642 may be configured to generate a semantic mesh, for example, using 3D reconstruction techniques (e.g., algorithms or machine learning models) that provide a 3D triangle mesh representing surfaces of a physical environment and/or semantic image segmentation techniques (e.g., algorithms or machine learning models) to annotate or classify objects of the physical environment.

The graphing unit 644 may be configured to generate a scene graph or object relationship graph. In some implementations, the graphing unit 644 is configured to classify objects and estimate relationships between the objects, for example, using a machine learning model (e.g., neural network) that uses a representation of an original semantic mesh provided by the identification unit 642.

The re-identification unit 646 may be configured to re-identify, re-annotate, or re-classify objects of the physical environment. For example, the re-identification unit 646 may be configured to re-generate a semantic mesh, for example, using 3D reconstruction techniques (e.g., algorithms or machine learning models) that provide a 3D triangle mesh representing surfaces of a physical environment and/or semantic image segmentation techniques (e.g., algorithms or machine learning models) to annotate or classify objects of the physical environment.

The XR rendering unit 648 may be configured to render XR environments that include depictions of the physical environment, virtual content, or both. The XR rendering unit 648 may be configured to utilize objects and/or relationships classified or estimated by the graphing unit 644. For example, the XR rendering unit 648 may determine to place a virtual vase on "the table next to the window" based on a determination that the current environment matches a previous environment, e.g., matching the location of the virtual vase in the current environment to that of the previous environment.

Moreover, FIG. 6 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 7:
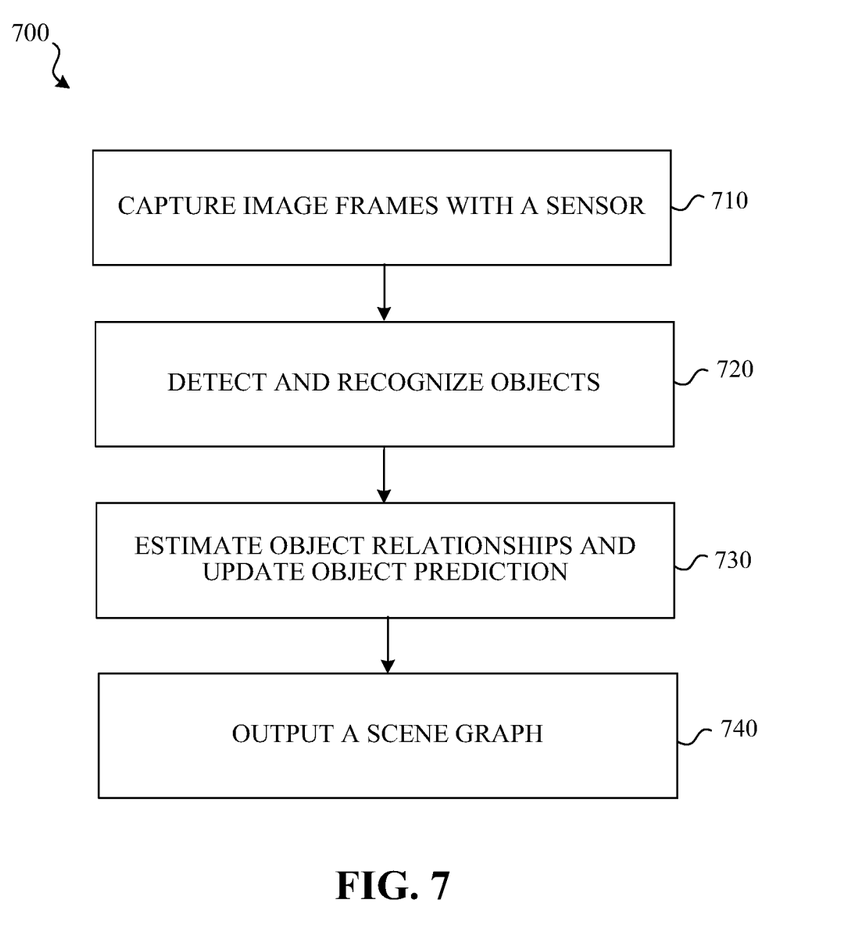
FIG. 7 is a flowchart illustrating an exemplary method for generating a scene graph for a current environment.

FIG. 7 is a flowchart illustrating an exemplary method for generating a scene graph for a current environment according to some implementations. In some implementations, the method 700 is performed by a device (e.g., controller 110 or electronic device 120 of FIGS. 1-6). The method 700 can be performed at a television, set-top box, mobile device, HMD, desktop, laptop, server device, or by multiple devices in communication with one another. In some implementations, the method 700 is performed by processing logic, including hardware, firmware, software, or a combination thereof. In some implementations, the method 700 is performed by a processor executing code stored in a non-transitory computer-readable medium (e.g., a memory).

At block 710, the method 700 captures image frames with a sensor, e.g., one or more sensors. In some implementations, a camera captures a sequence of images or video frames of the physical environment.

At block 720, the method 720 detects and recognizes objects in the image frames. Objects may be detected and/or recognized using one or more neural networks or other machine learning models trained to find and identify particular geometric primitives and/or object types. Each pixel of the images corresponding to an object may be associated with semantic data that identifies an object type of the object corresponding to the respective pixel.

At block 730, the method 700 estimates object relationships and updates object predictions. In some implementations, a physical environment is represented by object information that identifies objects and their 2D or 3D positions, e.g., using 2D or 3D bounding boxes, and this information is used to estimate object relationships and update object predictions, e.g., the identities and positions of 3D objects. In some implementations, the objects and relative 2D or 3D locations of the objects (e.g., or their respective bounding boxes) in 2D or 3D coordinates are used to determine room type, objects, object-to-object relationships, meta information (e.g., color, material, etc.), and features.

At block 740, the method 700 outputs a scene graph. The scene graph may represent various information, for example, providing a hierarchy that represents room type, objects, object-to-object relationships, meta information (e.g., color, material, etc.), and features. An exemplary scene graph may include a room node and the room node may identify metadata (e.g., room type=living room) and be linked to 4 wall objects, a table object, and six chair objects. Moreover, a chair object may identify metadata and features (e.g., identifying object type/semantic label=chair, it has a 3D mesh with specific node locations, it has a color of brown, it has particular keyframes or keyframe portions, etc. The scene graph may also represent positional relationships of objects relative to the room and/or one another, e.g., within, adjacent to, facing, etc.

Scene graphs may organize object-specific information and object relationships, for example in a hierarchical arrangement, and thus enable more robust comparison. Thus, in some implementations, the scene graph for the current environment represents objects within the current environment, relationships between the objects within the current environment, metadata about the objects, and additional features of the physical environment and its objects in a hierarchical environment to facilitate efficient evaluation and comparison with other such scene graphs.

Figure 8:
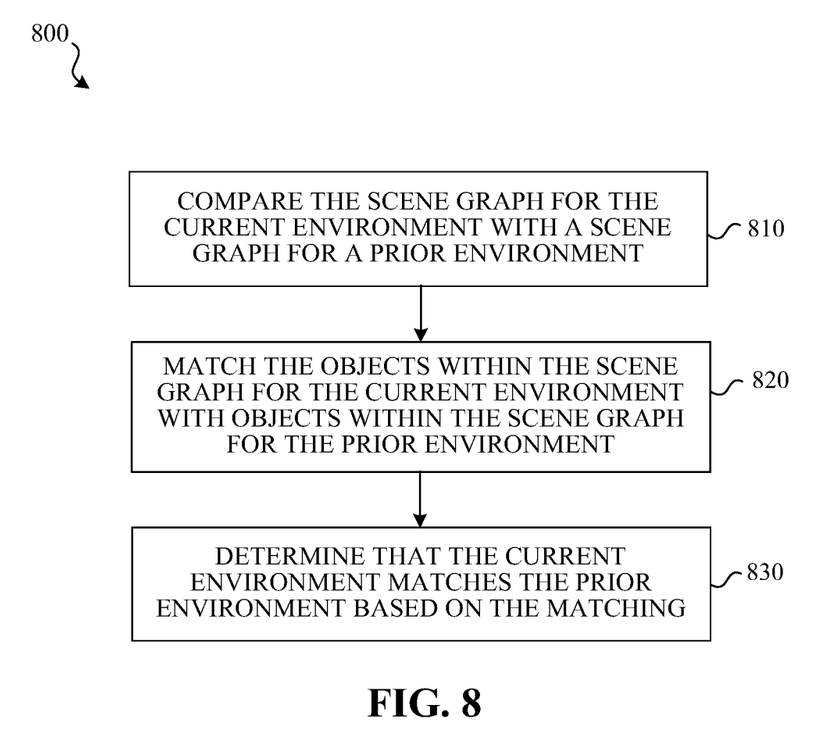
FIG. 8 is a flowchart illustrating an exemplary method for determining that the current environment matches a prior environment.

FIG. 8 is a flowchart illustrating an exemplary method for determining that the current environment matches a prior environment according to some implementations. In some implementations, the method 800 is performed by a device (e.g., controller 110 or electronic device 120 of FIGS. 1-6). The method 800 can be performed at a television, set-top box, mobile device, HMD, desktop, laptop, server device, or by multiple devices in communication with one another. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 compares the scene graph for the current environment with a scene graph for a prior environment. In some implementations, the method 800 matches a current scene graph for the user's current environment to a prior scene graph for a prior user environment to determine that the user is in the same environment. Prior techniques attempted to match keyframes or features and often failed to identify that the user is in a prior user environment because environmental changes (e.g., movement of a chair, lighting, etc.) caused the matching to fail. For example, a scene graph comparison may match a chair in two scene graphs even if the chair has been moved within the environment.

At block 820, the method 800 matches the objects within the scene graph for the current environment with objects within the scene graph for the prior environment. In some implementations, the comparing attempts to match object metadata, object types/semantic labels, object-specific 3D meshes, object-specific keyframes, object location information, or object relationships. For example, block 820 of method 800 may compare object location information or relationships associated with the objects within the scene graph for the current environment with object location information or relationships associated with the objects within the scene graph for the prior environment.

In some implementations, the comparing may exclude certain types of objects, e.g., object types that are transient such as food containers. In some implementations, the comparing may produce a score. For example, the comparing may be multi-step and may refine a score in steps, e.g., first compare the room objects and obtain a score and proceed to compare objects within the room only if the score is high enough, and then refine the score based on the additional matching of those objects.

At block 830, the method 800 determines that the current environment matches the prior environment based on the matching. In some implementations, the output of block 830 is a yes/no match determination and, in some other implementations, the output of block 830 is a matching score or probability of a match. For example, block 830 of method 800 may involve determining that the user is the same room or that the user is in a current room that is very similar to another room, e.g., a room with the same floor plan and furniture objects.

In some implementations, block 830 of method 800 may include a multi-step matching process or refining a matching score. In some implementations, block 830 of method 300 may discontinue matching to make the process more efficient. For example, matching may be discontinued if method 800 determines a room is a living room with dimensions that differ from a prior room, e.g., a kitchen with different dimensions.

In some implementations, the method 800 may enhance the current environment based on the prior environment and the determination that the current environment matches the prior environment. For example, the method 800 may put a virtual object back on the table of a current environment based on determining that a virtual object was placed on the table of the matching prior environment.

Figure 9:
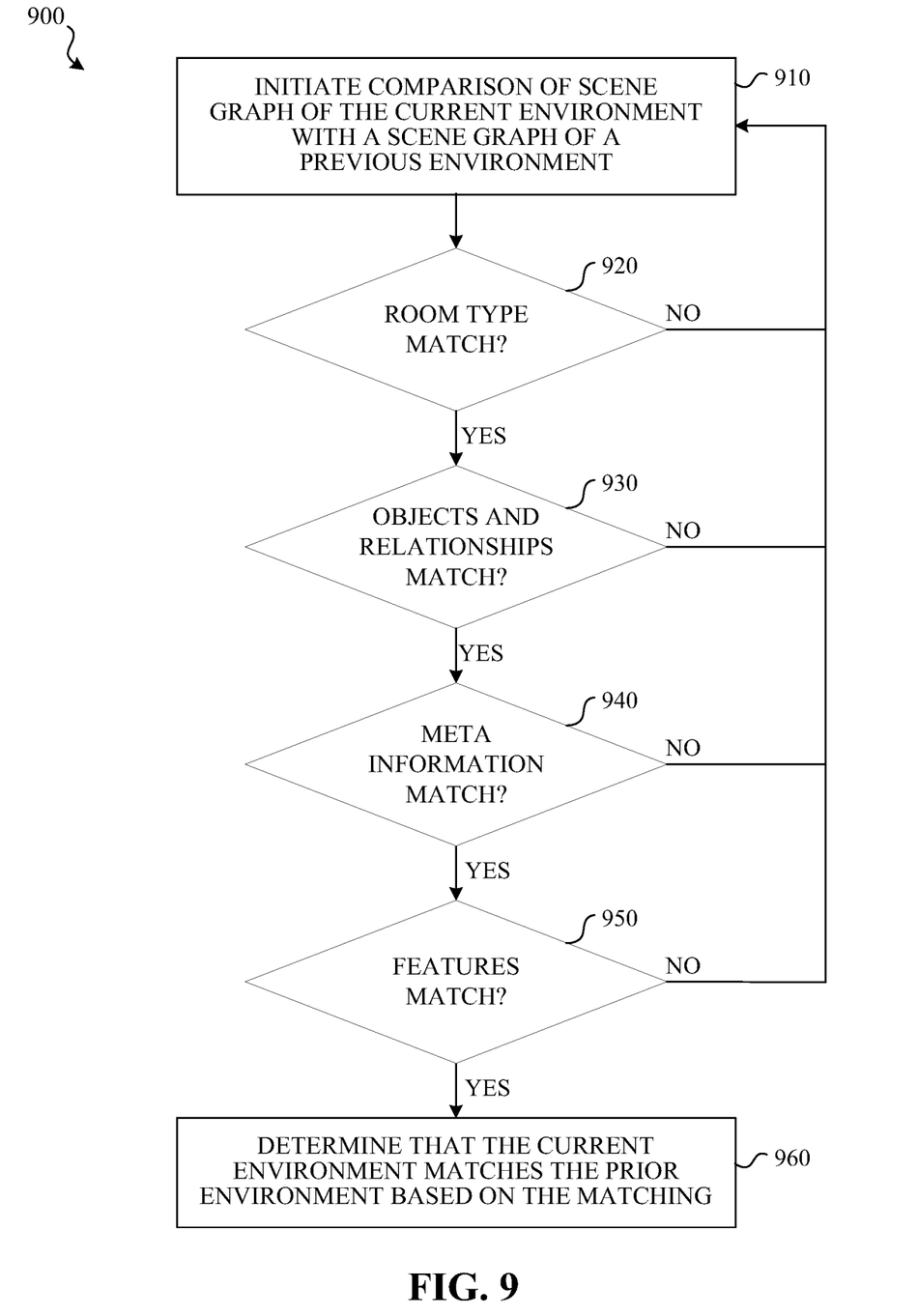
FIG. 9 is a flowchart illustrating an exemplary hierarchical method for determining that the current environment matches a prior environment.

FIG. 9 is a flowchart illustrating an exemplary hierarchical method for determining that the current environment matches a prior environment according to some implementations. In some implementations, the method 900 is performed by a device (e.g., controller 110 or electronic device 120 of FIGS. 1-6). The method 900 can be performed at a television, set-top box, mobile device, HMD, desktop, laptop, server device, or by multiple devices in communication with one another. In some implementations, the method 900 is performed by processing logic, including hardware, firmware, software, or a combination thereof. In some implementations, the method 900 is performed by a processor executing code stored in a non-transitory computer-readable medium (e.g., a memory).

At block 910, the method 900 initiates a comparison of a scene graph of the current environment with a scene graph of a previous environment.

In this example, at block 920, the method 900 attempts to match the room type of the current environment with the room type of the previous environment. If there is not a sufficient match, the method 900 discontinues the comparison and returns to block 910 to compare the scene graph of the current environment with a scene graph of another previous environment. If there is a sufficient match, the method 900 continues block 930 for further comparison.

In this example, at block 930, the method 900 attempts to match the objects and relationships of the current environment with the objects and relationships of the previous environment. If there is not a sufficient match, the method 900 discontinues the comparison and returns to block 910 to compare the scene graph of the current environment with a scene graph of another previous environment. If there is a sufficient match, the method 900 continues block 940 for further comparison.

In this example, at block 940, the method 900 attempts to match the objects and relationships of the current environment with the objects and relationships of the previous environment. If there is not a sufficient match, the method 900 discontinues the comparison and returns to block 910 to compare the scene graph of the current environment with a scene graph of another previous environment. If there is a sufficient match, the method 900 continues block 950 for further comparison.

In this example, at block 950, the method 900 attempts to match the meta information of the current environment with the meta information of the previous environment. If there is not a sufficient match, the method 900 discontinues the comparison and returns to block 910 to compare the scene graph of the current environment with a scene graph of another previous environment. If there is a sufficient match, the method 900 continues block 960 and determines that the current environment matches the previous environment based on the matching.

During the matching in blocks 920, 930, 940, 950, the method 900 may continue to determine and refine a matching score that is used to determine during the method 900 to continue with additional matching within the hierarchy of the scene graphs or to exit the method 900 without performing additional matching, for example, if the current level of matching produces a score that does not satisfy a threshold. Using hierarchical scene graphs and hierarchical matching enable a fast and efficient scene re-identification process that avoids wasting time and computing resources on unnecessary comparisons.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at a processor:
generating a scene graph for a current environment based on one or more images of the current environment, the scene graph for the current environment representing objects within the current environment and relationships between the objects within the current environment
comparing the scene graph for the current environment with a scene graph for a prior environment based on matching the objects within the scene graph for the current environment with objects within the scene graph for the prior environment;
determining that the current environment matches the prior environment based on the matching; and
based on said determining that the current environment matches the prior environment, determining that a current location associated with the user is within the prior environment.

2. The method of claim 1 further comprising comparing object metadata associated with the objects within the scene graph for the current environment with object metadata associated with the objects within the scene graph for the prior environment.

3. The method of claim 1 further comprising comparing object-specific meshes associated with the objects within the scene graph for the current environment with object-specific meshes associated with the objects within the scene graph for the prior environment.

4. The method of claim 1 further comprising comparing object-specific keyframes associated with the objects within the scene graph for the current environment with object-specific keyframes associated with the objects within the scene graph for the prior environment.

5. The method of claim 1 further comprising comparing object location information or relationships associated with the objects within the scene graph for the current environment with object location information or relationships associated with the objects within the scene graph for the prior environment.

6. The method of claim 1, wherein one or more types of objects are excluded from the comparison of the scene graph for the current environment with the scene graph for the prior environment.

7. The method of claim 6, wherein object types that are transient are excluded from the comparison of the scene graph for the current environment with the scene graph for the prior environment.

8. The method of claim 1, wherein matching the objects within the scene graph for the current environment with the objects within the scene graph for the prior environment includes a multi-step matching process.

9. The method of claim 8, wherein the multi-step matching process includes refining a matching score.

10. The method of claim 1, wherein the multi-step matching process is discontinued based on criteria or a low score.

11. The method of claim 1 further comprising identifying that a user is in the same room based on the determination that the current environment matches the prior environment.

12. The method of claim 1 further comprising identifying that a user is in a similar room based on the determination that the current environment matches the prior environment.

13. The method of claim 1 further comprising enhancing the current environment based on the prior environment and the determination that the current environment matches the prior environment.

14. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
generating a scene graph for a current environment based on one or more images of the current environment, the scene graph for the current environment representing objects within the current environment and relationships between the objects within the current environment;
comparing the scene graph for the current environment with a scene graph for a prior environment based on matching the objects within the scene graph for the current environment with objects within the scene graph for the prior environment;
determining that the current environment matches the prior environment based on the matching; and
based on said determining that the current environment matches the prior environment, determining that a current location associated with the user is within the prior environment.

15. The system of claim 14, the operations further comprising comparing object metadata associated with the objects within the scene graph for the current environment with object metadata associated with the objects within the scene graph for the prior environment.

16. The system of claim 14, the operations further comprising comparing object-specific meshes associated with the objects within the scene graph for the current environment with object-specific meshes associated with the objects within the scene graph for the prior environment.

17. The system of claim 14, the operations further comprising comparing object-specific keyframes associated with the objects within the scene graph for the current environment with object-specific keyframes associated with the objects within the scene graph for the prior environment.

18. The system of claim 14, the operations further comprising comparing object location information or relationships associated with the objects within the scene graph for the current environment with object location information or relationships associated with the objects within the scene graph for the prior environment.

19. The system of claim 14, wherein one or more types of objects are excluded from the comparison of the scene graph for the current environment with the scene graph for the prior environment.

20. A non-transitory computer-readable storage medium, storing program instructions computer-executable on a computer to perform operations comprising:
generating a scene graph for a current environment based on one or more images of the current environment, the scene graph for the current environment representing objects within the current environment and relationships between the objects within the current environment; and
comparing the scene graph for the current environment with a scene graph for a prior environment based on matching the objects within the scene graph for the current environment with objects within the scene graph for the prior environment;
determining that the current environment matches the prior environment based on the matching; and based on said determining that the current environment matches the prior environment, determining that a current location associated with the user is within the prior environment.

* * * * *